United States Patent [19]

McCall

[11] Patent Number: 5,245,152

[45] Date of Patent: Sep. 14, 1993

[54] DIELECTRIC FLUID DUST EXTRACTION SYSTEM FOR ELECTRIC DISCHARGE MACHINE

[75] Inventor: Stephen C. McCall, Lansing, Ill.

[73] Assignee: Klein Tools, Inc., Chicago, Ill.

[21] Appl. No.: 896,050

[22] Filed: Jun. 9, 1992

[51] Int. Cl.⁵ .......................... B23H 1/10; B23Q 11/10
[52] U.S. Cl. .................................. 219/69.14; 239/291; 409/134; 409/137
[58] Field of Search .......................... 219/69.14, 69.15; 408/56-61; 409/134-137; 204/129.6; 51/267; 239/290, 291, 294, 295, 296, 297, 300

[56] References Cited

U.S. PATENT DOCUMENTS

| | | | |
|---|---|---|---|
| 1,611,028 | 12/1926 | Harrison | 175/208 |
| 2,303,280 | 11/1942 | Jenkins | 239/96 |
| 2,327,483 | 8/1943 | Aitchison et al. | 175/11 |
| 2,404,149 | 7/1946 | Trinkle | 409/136 |
| 2,644,275 | 7/1953 | Hoguet | 51/439 |
| 2,837,972 | 6/1958 | Knowles | 409/134 |
| 3,245,321 | 4/1966 | Pankonin et al. | 409/99 |
| 3,533,327 | 10/1970 | Hagerty | 409/137 |
| 3,600,546 | 8/1971 | Niwa | 219/69.14 |
| 3,868,195 | 2/1975 | Anderson et al. | 408/61 |
| 4,778,315 | 10/1988 | Duffy et al. | 409/136 |
| 4,798,505 | 1/1989 | Ameseder | 409/136 |
| 4,822,218 | 4/1989 | Satoh | 409/136 |
| 4,946,322 | 8/1990 | Colligan | 409/137 |
| 5,038,012 | 4/1989 | Walter | 219/69.15 |

FOREIGN PATENT DOCUMENTS

| | | | |
|---|---|---|---|
| 58-217232 | 12/1983 | Japan | 219/69.14 |
| 60-259331 | 12/1985 | Japan | 219/69.15 |

OTHER PUBLICATIONS

Advertising brochure entitled "Rigid Graphite Dust Extraction Systems", Rigid Machine Tool Inc., Laguna Hills, Calif., 2 pp. (No Date).

Primary Examiner—Geoffrey S. Evans
Attorney, Agent, or Firm—Welsh & Katz, Ltd.

[57] ABSTRACT

A device mounted about a tool handling spindle of a machine tool for entrapping dust and particles produced in the milling of a graphite workpiece. The device uses Electric Discharge Machining (EDM) fluid to form a closed envelope surrounding the milling point. The device includes a collar having a first annular groove in fluid communication with an endless radial nozzle which emits the fluid envelope. The collar also includes a second annular groove concentrically disposed in relation to the first annular groove. An adjustable spraying attachment for use in directing a flow of EDM fluid on or about the milling point, is attached to the collar and in fluid communication with the second annular groove.

17 Claims, 2 Drawing Sheets

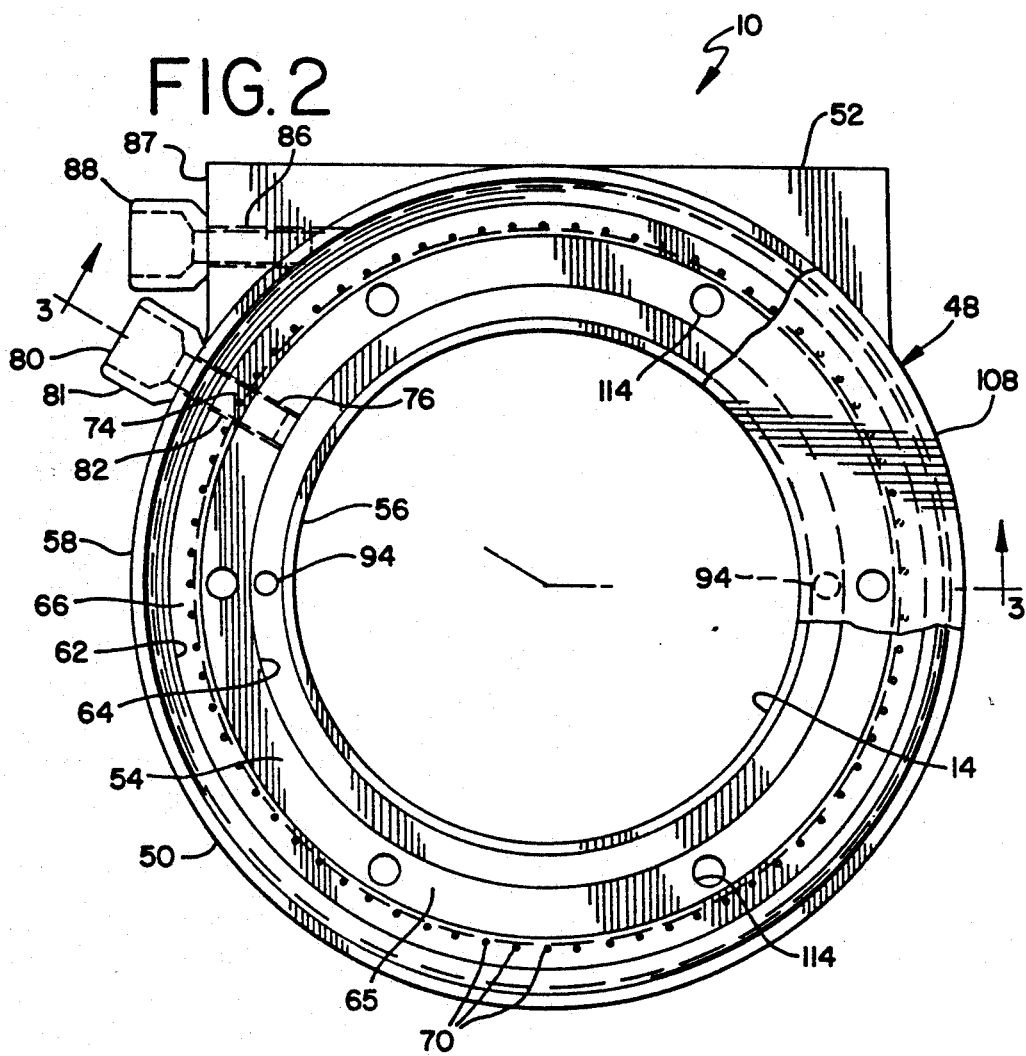
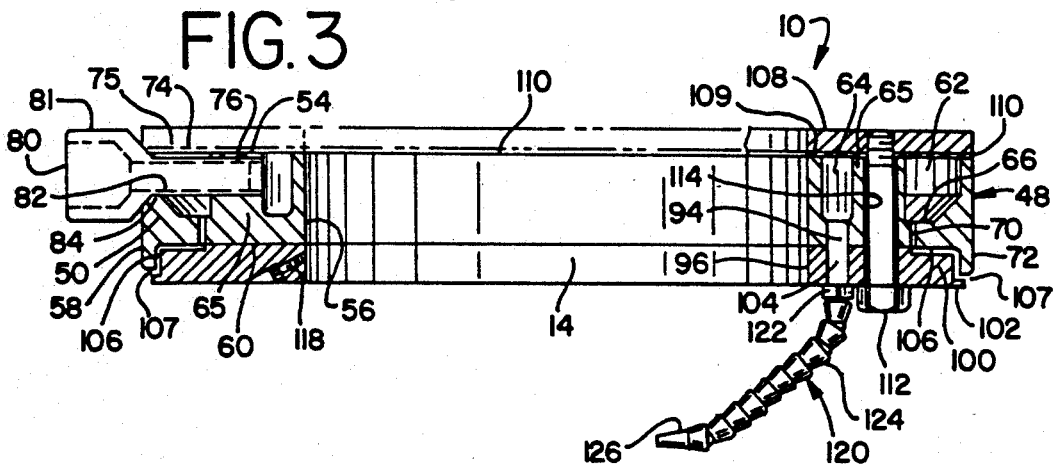

DIELECTRIC FLUID DUST EXTRACTION SYSTEM FOR ELECTRIC DISCHARGE MACHINE

BACKGROUND OF THE INVENTION

The present invention relates generally to machine tools and, more specifically, to electric discharge machining technology which employs electric discharge machining fluid as an insulating and cleansing medium in the production of metal dies such as forging dies. In the present invention, the electric discharge machining fluid is also used as a dust entrapment medium and flushing fluid during the machining of graphite electrodes which are used in the electric discharge machining process.

It is well known that one method for creation of dies such as forging dies, made from various alloys is the process of electric discharge machining (hereafter referred to as "EDM") using machinery designed for that purpose. In this process, a graphite electrode or block having a surface with a "positive" pattern in the form of the desired shape of a part, and a surface of a metal die block to be machined, are placed in an EDM bath and separated a predetermined distance known as the spark gap. The EDM bath consists of a tank filled with EDM fluid. EDM fluid is a trade name which identifies a fluid specially formulated for use in the EDM process. In addition to several other particular attributes well known to practitioners in the EDM art, the EDM fluid does not contain water, and is nonvolatile and nonconductive.

A voltage differential is then applied between the graphite electrode and the metal block. The voltage differential will cause opposing surfaces of the graphite electrode and metal block to spark. This sparking action will cause the surface of the metal block to erode until it assumes a shape which is the "negative" of the positive pattern on the graphite electrode. After some minor machining, the metal block can then be used as a die in various manufacturing applications such as in a metal forging operation or plastic injection molding.

During the EDM process, in addition to the metal particles caused by the erosion of the surface of the metal block, there is also a partial erosion of the surface of the graphite electrode which produces graphite particles. For the EDM to function properly it is necessary to remove any of the metal and graphite particles generated during the process. Therefore, EDM apparatuses normally include dielectric fluid pumping and filtering systems which, during the EDM process, continuously take EDM fluid from the EDM bath, filter the fluid and either circulate the cleansed fluid through the bath or use the fluid to flush the spark gap. In most such EDM devices, the fluid filtering and flushing systems operate continuously during machining.

After a metal die has been machined by the EDM process, the positive pattern in the graphite electrode will need to be remachined to the desired shape to compensate for the erosion. A numerically controlled milling machine is typically used for this machining. During the machining or remachining of the graphite block patterns, a substantial amount of graphite dust and particles are generated. This dust can cause surrounding electronic apparatuses to short out and may also pose a health hazard to the operator of the machining device.

There are several known methods for dealing with the generated dust. One method involves an industrial vacuum cleaner having a suction nozzle disposed in close proximity to the working area. However, this suction nozzle and the accompanying hoses require frequent adjustment for different workpieces and interferes with the changing of the tooling, whether by the operator or by the numerically controlled milling machine.

Another method for dealing with the production of dust is the use of transparent covering hoods. However, to be effective, these hoods must cover the entire working area of the numerically controlled milling machine, which reduces their effectiveness in achieving satisfactory dust control. In addition, these hoods tend to obstruct the vision of the operator monitoring the machining operation.

A third method of dealing with the dust is through the use of a dust containment device, as disclosed in U.S. Pat. No. 4,798,505. The device uses cutting or cooling fluid, for example, of the type employed in the machining process, to create a fluid "curtain" about the workpiece. Thus, the space around the workpiece is sealed, and the dust particles are entrapped, by the curtain from the surrounding area. The use of coolant fluid to entrap particles, however, requires a separate filter system to continuously clean the graphite dust and particles from the coolant system before it is reintroduced back into the machining process.

Another disadvantage of these filtering systems is that they typically do not remove all the material particles from the coolant fluid. Any remaining unfiltered particles eventually clog up the distribution system for the fluid curtain, causing holes in the curtain, and reducing the curtain's effectiveness in dust suppression. In addition, the use of a cutting or cooling fluid as a dust extraction curtain will contaminate the surface of the graphite electrode in the EDM process. All presence of the contaminating fluid must be removed before the graphite electrode can be used in the EDM process.

Yet another disadvantage of the above-described curtain forming device is the use of fixed sloping nozzles to divert a portion of the cutting fluid onto the tool. Due to the fixed nature of the nozzles, the flow direction of the fluid emitted from these nozzles cannot be altered to compensate for the various shaped workpieces or milling tools. Finally, because the nozzles obtain the fluid from the chamber which forms the curtain, the nozzles cannot be utilized unless the curtain is operating.

SUMMARY OF THE INVENTION

It is, therefore, an object of the present invention to provide a device for suppressing the dust generated during the machining of graphite electrodes. A related object of the invention is to provide this dust suppression method using the EDM fluid filtering system already present in the EDM operation.

Another object of the present invention is to allow the operator easy access to the tool spindle without impeding the vision of the operator during the machining process.

A further object of the present invention is to prevent contamination of the graphite electrode during the machining process and thereby eliminate any cleansing step before introduction of the graphite electrode into the EDM process.

A still further object of the present invention is to allow the operator the ability to direct a fluid onto the tool to flush away any particles and to adjust the direction of fluid onto the tool and workpiece to compensate for different configurations of the workpiece in machining operations. A related object of the present invention is to allow the operator the ability to use either the dust suppression or the flushing device if he should so choose.

The present invention meets or exceeds the above objects by featuring a dust extraction device for EDM machinery which provides a closed envelope of EDM fluid and at least one directable spray of the same fluid to entrap dust and particles originating from the machining of graphite electrodes. The device is designed to be used with a EDM filter and pumping apparatus which is an integral part of an Electric Discharge Machining system.

More specifically, the invention includes a device for entrapping and removing dust and particles originating from a milling operation being performed on a workpiece, the device including a collar including a ring portion having a lower face and an upper face. The ring portion has a first annular groove and a second annular groove concentrically disposed in relation to first annular groove. The device also includes a lower disk attached to the ring portion with the lower disk having an outer circumferential portion. The lower face of the ring portion and the circumferential portion of the lower disk define an endless radial nozzle in fluid communication with the first annular groove. The collar includes flow directing ports for providing and controlling a fluid flow to the endless radial nozzle. The device further includes a spraying attachment in fluid communication with the second annular groove for adjustably directing fluid flow onto the milling operation.

A supply pipe provides fluid to the first and second annular grooves so that fluid provided to the first annular groove is discharged from the endless radial nozzle as a closed fluid envelope entrapping dust and particles, and the fluid provided to the second annular groove is discharged from the spraying attachment to flush away particles from the workpiece. At least one valve is provided to control the flow of fluid to the first and second annular grooves, respectively.

The present dust extraction device is mounted on and encircles a spindle of a milling machine. EDM fluid exiting the endless radial nozzle will form a closed envelope to entrap the dust and particles but will not interfere with an operators view of the milling process. The operator may also use the adjustable spraying attachment to direct a flow of the EDM fluid of a particular location on the machine tool or workpiece.

BRIEF DESCRIPTION OF THE DRAWINGS

The invention is described in greater detail hereinafter in conjunction with the attached drawings, wherein like reference/numerals designate like parts. In the drawings:

FIG. 2 is a top plan view of the device with the majority of the top plate removed for clarity; and FIG. 3 is a sectional view taken along the line 3—3 of FIG. 2 and in the direction indicated generally.

DETAILED DESCRIPTION OF THE PREFERRED EMBODIMENT

Figure 1:
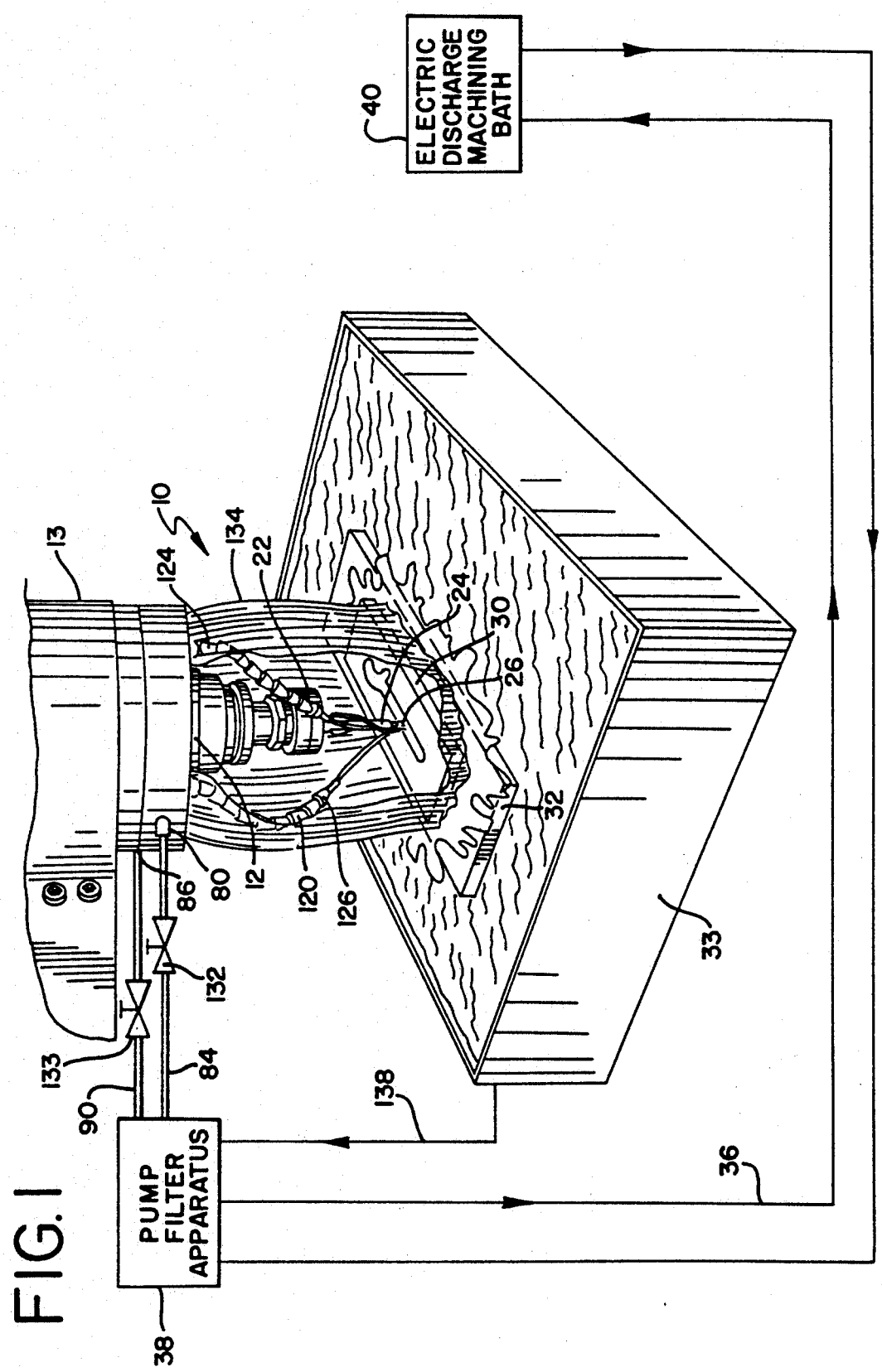
FIG. 1 is a perspective view showing the present invention mounted on a typical milling machine with the fluid envelope partially cut away for clarity.

Referring to FIG. 1, the preferred embodiment of the dielectric fluid dust extraction device for electric discharge machinery as contemplated herein is generally indicated at 10. The device 10 is shown mounted on the tool holding spindle 12 of a typical numerically controlled milling machine (not shown) and is disposed directly under the tool holder spindle flange 13. The device 10 defines an axial bore 14 (FIG. 2) through which the tool holding spindle 12 of the milling machine extends. Attached to the tool holding spindle 12 is a tool holder 22 to which a cutting tool 24 is attached. Cutting tool 24 is used to perform machining operations at a milling point 26 on a workpiece 30. The workpiece 30 is mounted on an electrode locator plate 32 which is attached to a milling machine bed 33.

In a typical electric discharge machining (EDM) system, a supply line 36 transports EDM fluid from a fluid filter and pump system or apparatus 38 to an EDM bath 40. EDM fluid is a trade name given to fluid especially formulated for use in the EDM process. Among other specific attributes known to practitioners in the EDM art, the fluid does not contain water, and is nonvolatile and nonconductive. The fluid filter and pump system 38 cleanses and pressurizes the EDM fluid.

In the EDM bath 40, electric discharge machinery creates forging dies in a process well known in the art. The EDM fluid is circulated through the bath 40 to collect and remove any graphite and metal particles which are formed as a result of the EDM process. The EDM fluid containing the graphite and metal particles is then collected and pumped to the filter system 38, where the graphite and metal particles are filtered out. The filtered EDM fluid is then capable of being reused in the EDM process.

Referring to FIGS. 2 and 3, the device 10 includes a collar generally designated 48 having a circular ring portion 50 integrally connected to a block portion 52. The ring portion 50 has an upper face 54, an inner face 56, an outer face 58 and a lower face 60 and includes two upwardly opening concentric annular grooves 62 and 64. A portion of the ring portion 50 intermediate the first upward opening annular groove 62 and the second upward opening annular groove 64 defines an annular rib 65. The first annular groove 62 has a polygonal cross section as shown.

Provided along a bottom surface 66 of the first annular groove 62 is a series of circumferentially evenly spaced vertical distribution ports 70 which extend through to the lower face 60. The lower face 60 also includes a depending ledge 72 extending circumferentially around the outer face 58 of the ring portion 50.

The ring portion 50 includes a radial bore 74 extending from the outer face 58 and being in communication with the second annular groove 64. The radial bore 74 includes a circumferential O-ring groove 75 located proximate the outer face 58. A threaded tubular surface 76 is formed by the extension of the bore 74 through the annular rib 65. A fluid fitting 80 has an exterior sleeve portion 81 with a knurled outer surface and an interior sleeve portion 82. The interior sleeve portion 82 of the fluid fitting 80 extends within radial bore 74 to the second annular groove 64. The fluid fitting 80 provides fluid communication between a second supply line 84 (FIG. 1) and the second annular groove 64. A portion of the outer surface of the interior sleeve portion 82 located within the annular rib 65 is provided with threads mating those on the tubular surface 76. The threaded engagement between the interior sleeve portion 82 and the tubular surface 76 is such that upon screwing the interior sleeve portion of the fluid fitting 80 into the tubular surface 76, there is no leakage of fluid from the first annular groove 62 into the second annular groove 64 or vice versa. An O-ring 84 seated within the O-ring groove 75 prevents the leakage of fluid from the first annular groove 62 to the outer face 58.

An inlet port 86 laterally extends from a side 87 of the block portion 52 to be in fluid communication with the first annular groove 62. A fluid fitting 88 is fitted into the inlet port 86. The fluid fitting 88 and the inlet port 86 provide fluid communication from a first supply line 90 (FIG. 1) to the first annular groove 62.

The ring portion 50 includes two nozzle bores 94 preferably aligned 180 from each other. The nozzle bores 94 extend upward from the lower face 60 into the second annular groove 64.

Also included in the device 10 is a lower ring-like disk 96 having an outer circumferential portion 100 which is vertically thinned as shown in FIG. 3. The inner radial distance of this circumferential portion from the center of the ring portion 50 is less than the radial distance of the vertical distribution ports 70 from the same point. The circumferential portion 100 includes a radial lip 102 having an outer diameter slightly less than the outer diameter of the ring portion 50, as shown, with the diameter differential of these components in the preferred embodiment being approximately ⅛ of an inch. Vertically extending through the lower disk 96 are nozzle ports 104 which are sized and shaped to correspond to the nozzle bores 94 in the collar 34. Upon assembly of the device 10, nozzle ports 104 ar aligned and in fluid communication with the nozzle bores 94.

The circumferential portion 100, the radial lip 102 of the lower disk 96, and the lower face 60 and ledge 72 of the ring portion 50 combine to define an endless radial passage 106 which is in fluid communication with the vertical distribution ports 70. The passage 106 is generally step-shaped in cross-section. The radial lip 102 orients a nozzle opening 107 of the radial passage 106 in a generally horizontal direction.

An upper ring-like disk 108 having an outer radius equal to the outer radius of the ring portion 50 is included in the device 10. A gasket 110 having the shape of the upper disk 108 is intermediate the upper disk and the ring portion 50. The gasket 110 prevents fluid from migrating between the upper face 54 of the ring portion 50 and the lower face 109 of the upper disk 108. Upon assembly, the gasket 110 and lower face 109 of the upper disk 108 sealingly close the respective open upper ends of the first and the second annular grooves 62, 64.

As shown in FIG. 3, the device 10 is assembled using a plurality of bolts 112 which are each inserted into a corresponding bore 114. In the preferred embodiment, the bores 114 are aligned approximately 60° from each other and are located in the annular rib 65 so that the bolt holes do not penetrate the first annular groove 62 or second annular groove 64. In the preferred embodiment, the device 10 is attached to the tool holding spindle 12 (FIG. 1) using inclined bolts 118, however, other fastening configurations are contemplated.

The device 10 includes at least one spraying attachment, generally designated 120 having a hose fitting 122 attached to and in fluid communication with, the lower plate nozzle bores 104, with the preferred embodiment having two such spraying attachments. The spraying attachment 120 includes a hose portion 124 attached at one end to the hose fitting 122, and a nozzle 126 attached to the end of the hose portion 124 opposite the hose fitting. The hose portion 124 is articulatably adjustable to allow the operator to vary the orientation of the nozzle 126 in an infinite number of ways and thereby direct fluid onto a particular location on or adjacent the milling tool 24 and workpiece 30 (FIG. 1).

Referring now to FIG. 1, the second supply line 84 having a second valve 132 connects the filter system 38 to the fluid fitting 80, thereby providing controllable fluid communication between the filter system 38 and the second annular groove 64.

In operation, the EDM fluid is pumped by the filter system 38 through the second supply line 84 and into the second annular groove 64. The fluid then travels under line pressure through the nozzle bores 94 and nozzle ports 104, into the spraying attachment 120 and then out through the nozzles 126. The operator adjusts the nozzle 126 to direct the flow of pressurized fluid onto the desired location. The EDM fluid emitted by the nozzles 126 flushes out any graphite particles which reside in the milling point 26. The flushed particles are washed by the EDM fluid into the milling machine bed 33 beneath the electrode locator plate 32 and then into a reservoir (not shown). The EDM fluid and particles are then pumped from the reservoir via return piping 138 to the pumping and filtering system 38.

The first supply line 90 having a first valve 133 connects the filter system 38 to the first annular groove 62 via the inlet port 86, thereby providing controllable fluid communication between the filter system 38 and the first annular groove 62. The EDM fluid supplied by the filter system 38 flows through the first annular groove 62 and into the distribution ports 70. The distribution ports 70 are sized and spaced to provide sufficient back pressure so that the fluid fills the first annular groove 62, thereby ensuring that the volume flowing through each distribution port 70 is substantially equal regardless of the distance from that distribution port to the inlet port 86. Numerous combinations of distribution port 70 spacing and sizing would provide the needed substantially equal flow of fluid through each distribution port. In the preferred embodiment, seventy-two (72) distribution ports 70 are equally spaced around the first annular groove 62 and the diameter of each of the distribution ports is 1/16 of an inch.

The EDM fluid flows under pressure through the distribution ports 70 into the endless radial passage 106. Within the radial passage 106, the discrete flows from the individual distribution ports 70 commingle, thereby forming an endless radial flow which exits from the opening 107 of the radial passage in a generally horizontal orientation. An advantage of the step shaped configuration of the radial passage 106 in the preferred embodiment is that it enhances the uniformity of the radial flow of the fluid. The cross-sectional spacing of the radial passage 106 may be varied depending on the properties of the individual EDM fluid being used. The preferred embodiment has a cross-sectional spacing of 1/16 of an inch.

As shown in FIG. 1, the force of gravity will then cause the radial flow to turn downward and form a closed fluid envelope 134 around the milling point 26. The envelope 134 entraps particles and dust which are generated during the machining process, however, the fluid envelope does not act to substantially hinder the operators view of the machining operation. The entrapped dust and particles are washed by the EDM fluid into the milling machine bed 33 beneath the electrode locator plate 32 and then into the reservoir (not shown).

The EDM fluid bearing the dust and particles is then pumped from the reservoir via the return piping 138 to the filter system 38.

The typical milling machine (not shown) performs milling using an assortment of different tools 24. The typical machine will automatically disengage the tool holder 22 from the tool holding spindle 12, place the tool holder in a tool magazine (not shown), take a different tool holder from the tool magazine, insert the new tool holder into the tool holding spindle and resume the milling operation. One advantage offered by the present device 10 and the generation of the envelope 134 to envelope will not hinder the actions milling machine during this tool replacement process of the The first valve 133 and second valve 132 allow the operator to adjust the flow of the EDM fluid to the first annular groove 62 and second annular groove 64 respectively. The first valve 133 and second valve 132 also allow the operator to independently shut off the flow to the first annular groove 62 and second annular groove 64, thereby allowing the operator to employ the envelope 134 or the spraying attachment 120 either exclusively or together.

The ability to vary the flow of fluid to the first annular groove 62 allows the operator to vary the area defined by the fluid envelope 134 to account for differing size workpieces 30 and milling operations. For example, a smaller flow of fluid creates a smaller area defined by the envelope 134, and conversely a larger flow of fluid creates a larger area defined by the envelope.

The operator's ability to employ either the envelope 134 or the spraying attachment 120 has particular advantage when engaging in intricate machining of the workpiece 30. Although the envelope 134 allows the operator to view the machining point 26, the envelope may hinder the operator's view during intricate machining of the workpiece 30. The operator can then solely employ the spraying attachment 120 to provide dust suppression, thus allowing unhindered viewing of the milling point 26. Another advantage is that, through the use of the adjustable nozzles 126, the operator may selectively direct the flow of EDM fluid to specified portions of the workpiece.

A further advantage of the present invention is that because the fluid used to create the envelope 134 is not a cutting fluid but is EDM fluid, the entrapping fluid will not contaminate the surface of the workpiece. Therefore, after the workpiece has been machined to the desired shape, it may be placed directly in the EDM bath 40 to undergo the EDM process without fear of contamination of the process.

A still further advantage of the present invention is that the device 10 can be employed in a typical EDM operation with a minimum of additional requirements regardless of the source of the milling machinery or the EDM system. As before described, the typical EDM operation requires the use of the EDM fluid filter and pumping system 38. Also the typical milling machine (not shown) normally includes a milling machine bed 33 which collects fluid and transmits the fluid to a reservoir (not shown). Therefore, the requirements to employ the device 10 are minimal and include the supply lines 84 and 90 from the filter system 38 to the device 10 and the return piping 138 from the reservoir to the fluid system.

A specific embodiment of the novel Dielectric Fluid Dust Extraction Device Of Electric Discharge Machinery according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cove by the present invention any and all modifications, variations, or equivalents that fall within the true spirit and scope of the basic underlying principles disclosed and claimed herein.

What is claimed is:

1. A device for entrapping and removing dust and particles originating from a milling operation being performed on a workpiece, said device comprising:
   a collar including a ring portion having a lower face and an upper face, a first annular groove and a second annular groove concentrically disposed in relation to said first annular groove in said ring portion;
   a lower disk attached to said ring portion, said lower disk having an outer circumferential portion, said lower face of said ring portion and said circumferential portion of said lower disk defining an endless radial nozzle being in fluid communication with said first annular groove;
   flow directing means on said collar for providing and controlling a flow of fluid to said endless radial nozzle;
   spraying means in fluid communication with said second annular groove for adjustably directing flow of the fluid onto the milling operation;
   whereby a first portion of the fluid provided to said first annular groove is discharged from said endless radial nozzle as a closed fluid envelope entrapping dust and particles generated by the milling operation, and a second portion of the fluid provided to said second annular groove is discharged from said spraying means to flush away particles from the workpiece.

2. The device of claim 1 wherein said flow directing means includes a plurality of circumferentially spaced distribution ports extending from said second annular groove and being in fluid communication with said endless radial nozzle.

3. The device of claim 1 wherein said flow directing means further includes control means for controlling the flow of fluid to said first annular groove and said second annular groove.

4. The device of claim 3 wherein said control means includes a supply means for providing fluid to said ring portion and valve means for controlling the flow of fluid to said first and second annular grooves.

5. The device of claim 4, wherein said supply means includes threaded sealing means for preventing the leakage of fluid between said first annular groove and said second annular groove.

6. The device of claim 4 wherein said valve means includes a second valve for controlling the flow of fluid to said second annular groove, and a first valve for controlling the flow of fluid to said first annular groove.

7. The device of claim 1 wherein said circumferential portion includes a thinned portion having a radial lip for orienting the opening of said radial nozzle in a substantially horizontal direction.

8. The device of claim 1 wherein said endless radial nozzle has a generally step-shaped configuration.

9. The device of claim 1 wherein said spraying means includes at least one hose portion connected at one end to an underside of said ring portion and having a nozzle attached to an opposite end.

10. The device of claim 1 wherein the outer diameter of said circumferential portion of said lower disk is less than the outer diameter of said ring portion.

11. A device for entrapping and removing dust and particles originating from a milling operation being performed by a machine tool on a graphite workpiece, in an electric discharge machining system including an electric discharge machine fluid pumping and filtering apparatus, said device comprising:

a collar including a ring portion having a lower face and an upper face, a first annular groove and a second annular groove concentrically disposed in relation to said first annular groove on said ring portion, said ring portion being concentrically disposed about a tool handling spindle of the machine tool;

a lower disk axially aligned and attached to said ring portion, said lower disk having an outer circumferential portion, said lower face of said ring portion and said circumferential portion of said lower disk defining an endless radial nozzle in fluid communication with said first annular groove;

means for providing a radially spaced fluid flow from said first annular groove to said endless radial nozzle;

spraying means in fluid communication with said second annular groove for adjustably directing fluid flow onto the milling operation;

means for providing a flow of electric discharge machine fluid from the fluid pumping and filtering apparatus to said first annular groove and said second annular groove; and whereby the fluid provided to said first annular groove is discharged from said endless radial nozzle as a closed fluid envelope entrapping dust and particles generated by the milling operation, and the fluid provided to said second annular groove is discharged from said spraying means to flush away said particles from the workpiece.

12. The device of claim 11 wherein said means for providing a radial fluid flow includes a plurality of circumferentially spaced distribution ports extending from said second annular groove and being in fluid communication with said endless radial nozzle.

13. The device of claim 11 further including control means for controlling the flow of fluid to said first annular groove and said second annular groove.

14. The device of claim 13 wherein said control means includes a supply means for providing fluid to said ring portion and valve means for controlling the flow of fluid to said first and second annular groove.

15. The device of claim 11 wherein said endless radial nozzle has a generally step-shaped configuration.

16. An electric discharge machining system, including a device for entrapping and removing dust and particles originating from a milling operation being performed by a machine tool on a graphite workpiece, comprising:

an electric discharge machine fluid pumping and filtering apparatus for pumping and filtering a supply of electric discharge machine fluid;

a collar including a ring portion having a lower face and an upper face, a first annular groove and a second annular groove concentrically disposed in relation to said first annular groove on said ring portion, said ring portion being concentrically disposed about a tool handling spindle of the machine tool;

a lower disk axially aligned and attached to said ring portion, said lower disk having an outer circumferential thinned portion, said lower face of said ring portion and said thinned portion of said lower disk defining an endless radial nozzle in fluid communication with said first annular groove;

means for providing a radially spaced fluid flow from said first annular groove to said endless radial nozzle;

spraying means in fluid communication with said second annular groove for adjustably directing fluid flow onto the milling operation;

means for providing and for controlling a flow of electric discharge machine fluid from said fluid pumping and filtering apparatus to said first annular groove and said second annular groove; and means for collecting and returning said fluid to said fluid pumping and filtering apparatus;

whereby the fluid provided to said first annular groove is discharged from said endless radial nozzle as a closed fluid envelope entrapping dust and particles generated by the milling operation, and the fluid provided to said second annular groove is discharged from said spraying means to flush away said particles from said workpiece.

17. A machining system, including a device for entrapping and removing dust and particles originating from a milling operation on a graphite workpiece, comprising:

an electric discharge machine fluid pumping and filtering apparatus for pumping and filtering a supply of electric discharge machine fluid;

machine tool means for performing the milling operation, said machine tool means including a tool handling spindle;

a collar including a ring portion having a lower face and an upper face, a first annular groove and a second annular groove concentrically disposed in relation to said first annular groove on said ring portion, said ring portion being concentrically disposed about said tool handling spindle of said machine tool means;

a lower disk axially aligned and attached to said ring portion, said lower disk having an outer circumferential thinned portion, said lower face of said ring portion and said thinned portion of said lower disk defining an endless radial nozzle in fluid communication with said first annular groove;

means for providing a radially spaced fluid flow from said first annular groove to said endless radial nozzle;

spraying means in fluid communication with said second annular groove for adjustably directing fluid flow onto the milling operation;

means for providing and for controlling a flow of electric discharge machine fluid from said fluid pumping and filtering apparatus to said first annular groove and said second annular groove; and means for collecting and returning said fluid to said fluid pumping and filtering apparatus;

whereby said fluid provided to said first annular groove is discharged from said endless radial nozzle as a closed fluid envelope entrapping dust and particles generated by the milling operation, and said fluid provided to said second annular groove is discharged from said spraying means to flush away said particles from the workpiece.

* * * * *